Patented Oct. 12, 1948

2,451,429

UNITED STATES PATENT OFFICE 2,451,429

THIOPHANE CARBOXYHYDRAZIDES AND METHOD OF PREPARING THE SAME

Bernard R. Baker, Nanuet, and Merle V. Querry, Pearl River, N. Y., assignors, by mesne assignments, to American Cyanamid Company, New York, N. Y., a corporation of Maine No Drawing. Application August 13, 1945, Serial No. 610,682

11 Claims. (Cl. 260—329)

1

This invention relates to new organic compounds. More particularly it relates to ureylenethiophane carboxhydrazides and to methods of preparation thereof.

The new compounds of the present invention can be illustrated by the following general formula:

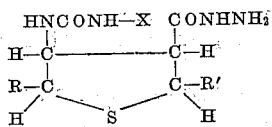

in which X is a hydrogen, aliphatic or aromatic radical and R and R' are hydrogen, or N-substituted carbamylalkylene radicals.

In general, the compounds of the present invention are white solids having relatively high melting points. They are slightly soluble in water, and in methanol or ethanol-water mixtures. They are soluble in dilute hydrochloric acid, but insoluble in most other solvents.

We have found, unexpectedly, that the uracil ring of certain tetrahydro-thieno-uracils, which will be named hereinafter, can be opened by heating a relatively short time with hydrazine hydrate. This is particularly surprising since it is known that a dihydrouracil ring can be cleaved only on prolonged boiling with alkali. The resulting compounds have the cis configuration and those having a substituted carboxybutyl side chain are particularly useful in that they may be converted into a substituted imidazolido thiophane which when heated with barium hydroxide forms 2-(delta-carboxybutyl)-3,4,cis-diaminothiophane which on treating with phosgene gives dl-biotin.

Compounds having the same empirical formula but with the trans configuration can be obtained by heating a tetrahydrothieno uracil with an alkali metal alkoxide to cleave the uracil ring and subsequently heating with hydrazine hydrate to form the desired compound.

The tetrahydrothieno uracils used as intermediates in the present invention can be prepared by reacting substituted ureylenethiophane carboxylic acids with an anhydride and an alkaline catalyst as described and claimed in our copending application Serial No. 610,185 filed August 10, 1945.

Among the intermediates which we can use, the following may be mentioned specifically: 3-phenyl-6-(delta - carbanilidobutyl)-5,6,8,9-tetrahydrothieno [3,4,e,cis] uracil; 3-phenyl-6-(delta-N - methylcarbamylbutyl) - 5,6,8,9 - tetrahydrothieno [3,4,e,cis] uracil; 3-phenyl-6-(delta-N-

2 ethylcarbamylbutyl) - 5,6,8,9 - tetrahydrothieno [3,4,e,cis] uracil; 3-methyl-6-(delta-carbanilidobutyl)-5,6,8,9-tetrahydrothieno [3,4,e,cis] uracil; 3-methyl - 6 - (delta - N - methylcarbamylbutyl)-5,6,8,9 - tetrahydrothieno [3,4,e,cis] uracil; 3-methyl-6-(delta-N-ethylcarbamylbutyl) - 5,6,8,9-tetrahydrothieno [3,4,e,cis] uracil; 3-phenyl-5,6,8,9-tetrahydrothieno [3,4,e,cis] uracil, 3-methyl-5,6,8,9-tetrahydrothieno [3,4,e,cis] uracil; 3-phenyl - 8 - (delta - carbanilidobutyl) - 5,6,8,9-tetrahydrothieno [3,4,e,cis] uracil; 3-methyl-8-(delta - carbanilidobutyl) - 5,6,8,9 - tetrahydrothieno [3,4,e,cis] uracil; and the like.

Hydrazine is a known compound usually available in the form of an acid salt such as hydrazine dihydrochloride or hydrazine sulfate and as hydrazine hydrate. We prefer to use hydrazine hydrate in carrying out the reaction of the present invention, since it is a liquid and no solvent is needed. Solvents such as methanol, ethanol, dioxane, etc. can be used, if desired. When salts of hydrazine are used a small amount of alkali is added to neutralize the acid salt and liberate free hydrazine.

The reaction used in preparing compounds of the present invention can be carried out at temperatures between about 60° and about 120° C. A convenient method of conducting the reaction is to mix the reactants and heat on a steam bath until the reaction is complete; a matter of minutes, usually from about ten minutes to about sixty minutes. When the reaction is carried out at lower temperatures a longer period of time is usually needed to complete the reaction.

During the course of the reaction the product usually separates out. It is recovered by diluting with water, to remove unreacted hydrazine and collected on a filter. The product obtained is generally pure enough for use in the next step of preparing biotin, but if a product of higher purity is desired it can be obtained by recrystallizing the product from a mixture of ethanol and water.

Our invention will now be illustrated in greater detail by means of the following specific examples, in which representative ureylenethiophane carboxhydrazides are prepared from corresponding tetrahydrothieno uracils. It will be understood, of course, that these examples are given for purposes of illustration and are not to be considered as limiting our invention to the particular details described therein.

*Example 1*

A mixture of 0.93 g. of 3-phenyl-6-(delta-carboxybutyl) - 5,6,8,9 - tetrahydrothieno [3,4,e,cis]

uracil, 5 cc. of dry ether, 2 drops of pyridine and 10 cc. of thionyl chloride was shaken until the solution was only slightly turbid (about 15 minutes). The volatile material was removed in vacuo (bath 40° C.) leaving a crystalline acid chloride. The latter, suspended in 50 cc. of acetone at 0° C., was shaken with 2.5 cc. of aniline until the acid chloride was in solution. The mixture was treated successively with 2.5 cc. of water, 2.5 cc. of concentrated hydrochloric acid and 125 cc. of water. The 3-phenyl-6-(delta-carbanilidobutyl)-5,6,8,9-tetrahydrothieno [3,4,e,cis] uracil was removed by filtration. A yield of 1.07 g. (95%) was obtained which on recrystallization from acetone-water mixture with the aid of Norite melted at 212°–213° C.

A mixture of 500 mg. of the compound obtained immediately above and 4 cc. of 100% hydrazine hydrate was heated on the steam bath with mixing for twenty minutes. At no time was solution complete, but the mixture became more pasty as the reaction proceeded. After dilution with water, the white solid was collected on a filter. A yield of 510 mg. (95%) of 2-(delta-carbanilidobutyl)-4-uranilinothiophane-cis - 3 - carboxhydrazide was obtained which melted at 210°–212° C. with decomposition.

The following equation illustrates the specific reaction which takes place in the above example.

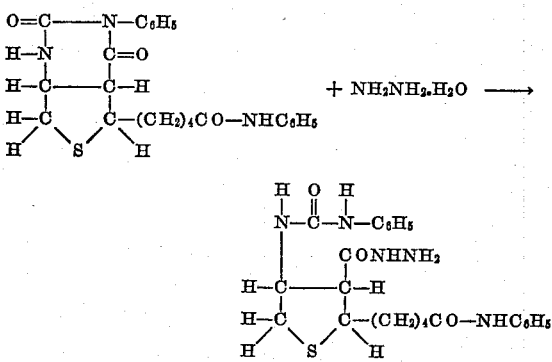

Example 2

A mixture of 3 g. of 3-phenyl-6-(delta-carbanilidobutyl) - 5,6,8,9 - tetrahydrothieno [3,4,e,cis] uracil and 25 cc. of 100% hydrazine hydrate was heated on the steam bath for twenty minutes with manual stirring. Ice water was added, the hydrazide was filtered off and was washed well with water. A yield of 3.0 g. (92%) of 2-(delta-carbanilidobutyl) - 4 - uranilinothiophane-cis-3-carboxhydrazide was obtained which melted at 208°–212° C.

Example 3

A solution of 100 mg. of 3-phenyl-5,6,8,9-tetrahydrothieno [3,4,e,cis] uracil in 0.1 cc. of 100% hydrazine hydrate was heated on the steam bath for ten minutes during which time the hydrazide separated. Dilution with water gave 105 mg. (92%) of 3-uranilinothiophane-cis-4-carboxhydrazide which melted at 184°–185° C.

Example 4

A solution of 70 mg. of 1-acetyl-3-phenyl-5,6,8,9-tetrahydrothieno [3,4,e,cis] uracil in 0.07 cc. of 100% hydrazine hydrate was heated on the steam bath for ten minutes during which time the hydrazide separated. Dilution with water gave 55 mg. (82%) of 3-uranilino-thiophane-cis-4-carboxhydrazide melting at 183°–184° C., identical with that prepared in Example 3.

Example 5

A solution of 160 mg. of 2-(delta-carboxybutyl)-3-carbomethoxy-trans-4-uranilino - thiophane in 0.3 cc. of 100% hydrazine hydrate was heated on the steam bath for fifteen minutes, diluted with water and acidified with 0.6 cc. of acetic acid. A somewhat gelatinous product was collected by filtration, washed with water, and dried on the steam bath. A yield of 140 mg. (88%) of 2-(delta-carboxybutyl)-3-carboxyhydrazide-trans-4-uranilinothiophane was obtained as a white powder melting at 215° C. with decomposition.

We claim:

1. Chemical compounds having the general formula:

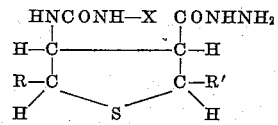

in which X is a member of the group consisting of hydrogen, alkyl and aryl radicals and R and R' are members of the group consisting of hydrogen, N-alkyl carbamylalkylene radicals and N-aryl carbamylalkylene radicals.

2. Chemical compounds having the general formula:

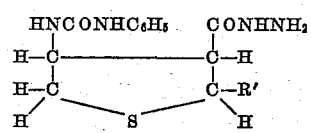

in which R' is an N-aryl carbamylalkylene radical.

3. Chemical compounds having the general formula:

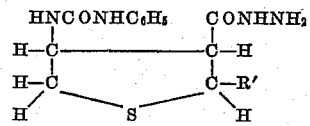

in which R' is a carbanilidoalkylene radical.

4. 2 - (delta-carbanilidobutyl) - 4 - uranilinothiophane-3-carboxhydrazide.

5. 2-(delta - carbanilidobutyl) - 4 - methyluramidothiophane-3-carboxhydrazide.

6. 2-(delta-carbanilidobutyl) - 4 - ethyluramidothiophane-3-carboxhydrazide.

7. A method of preparing compounds having the general formula:

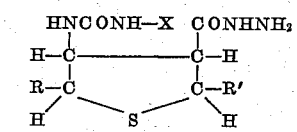

in which X is a member of the group consisting of hydrogen, alkyl and aryl radicals and R and R' are members of the group consisting of hydrogen, N-alkyl carbamylalkylene radicals and N-aryl carbamylalkylene radicals which comprises heating a compound having the formula:

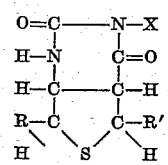

in which X, R and R' are as defined above, with hydrazine hydrate.

8. A method of preparing compounds having the general formula:

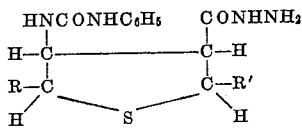

in which R and R' are members of the group consisting of hydrogen, N-alkyl carbamylalkylene radicals, and N-aryl carbamylalkylene radicals which comprises heating a compound having the formula:

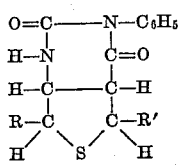

in which R and R' are as defined above, with hydrazine hydrate.

9. A method of preparing 2-(delta-carbanilidobutyl)-4-uranilino-thiophane-3-carboxhydrazide which comprises heating 3-phenyl-6-(delta-carbanilidobutyl)-5,6,8,9-tetrahydrothieno [3,4,e,cis] uracil with hydrazine hydrate.

10. A method of preparing 2-(delta-carbanilidobutyl)-4-methyl-uramidothiophane - 3 - carboxhydrazide which comprises heating 3-methyl-6-(delta-carbanilidobutyl) - 5,6,8,9-tetrahydro-thieno [3,4,e,cis] uracil with hydrazine hydrate.

11. A method of preparing 2-(delta-carbanilidobutyl) - 4 - ethyluramidothiophane- 3 -carboxhydrazide which comprises heating 3-ethyl-6-(delta-carbanilidobutyl)-5,6,8,9-tetrahydrothieno [3,4,e,cis] uracil with hydrazine hydrate.

BERNARD R. BAKER.
MERLE V. QUERRY.

REFERENCES CITED

The following references are of record in the file of this patent:
Chemical Abstracts, 29:4741-5 (1935).